US011957939B2

(12) United States Patent
Warren

(10) Patent No.: US 11,957,939 B2
(45) Date of Patent: Apr. 16, 2024

(54) FALL ARREST DEVICE

(71) Applicant: Rapid Rail International Limited, Cardiff (GB)

(72) Inventor: Adam Warren, Cwmbran (GB)

(73) Assignee: Rapid Rail International Limited, Cardiff (GB)

( * ) Notice: Subject to any disclaimer, the term of this patent is extended or adjusted under 35 U.S.C. 154(b) by 0 days.

(21) Appl. No.: 17/884,340

(22) Filed: Aug. 9, 2022

(65) Prior Publication Data

US 2023/0050164 A1 Feb. 16, 2023

(30) Foreign Application Priority Data

Aug. 10, 2021 (GB) ..................................... 2111485

(51) Int. Cl.
*A62B 35/00* (2006.01)
*A62B 35/04* (2006.01)

(52) U.S. Cl.
CPC .......... *A62B 35/0068* (2013.01); *A62B 35/04* (2013.01)

(58) Field of Classification Search
CPC ........ A62B 35/0068; A62B 35/04; A62B 1/14
See application file for complete search history.

(56) References Cited

U.S. PATENT DOCUMENTS 5,638,919 A * 6/1997 Pejout ...................... A62B 1/14 182/5
6,457,556 B1 10/2002 Skade et al.
6,896,101 B2 * 5/2005 Cowin .................. A63B 29/02 182/92
9,649,516 B2 * 5/2017 Meyer .................... A62B 35/04
10,047,560 B2 * 8/2018 Roth .................. A62B 35/0081
10,953,247 B2 * 3/2021 Muessig ................ A63B 29/02
11,406,851 B2 * 8/2022 Novotny .................. A62B 1/14
11,459,780 B2 * 10/2022 Martin Iglesias ..... E04G 21/329
11,642,554 B2 * 5/2023 Sulc .................. A62B 35/0081 188/65.1
2005/0284694 A1 * 12/2005 Faye ...................... A62B 35/04 182/3
2007/0113776 A1 * 5/2007 Vetesnik ................ B66C 23/90 116/212
2014/0008511 A1 1/2014 Xammar Bove

FOREIGN PATENT DOCUMENTS

WO WO-2019/126135 A1 6/2019

* cited by examiner

*Primary Examiner* — Anita M King
(74) *Attorney, Agent, or Firm* — Winstead PC

(57) ABSTRACT

The present invention provides a fall arrest device comprising a bracket having a first engagement element and a second engagement element aligned with the first engagement element; a cantilever element; and a deformable element that is dimensioned for plastic shock absorbing deformation or fracture on application of a predetermined load at the load application point.

6 Claims, 4 Drawing Sheets

FALL ARREST DEVICE

BACKGROUND OF THE INVENTION

The present invention relates to a fall arrest device, in particular the present invention relates to a fall arrest device that acts cantilever element to reduce the moment applied by a falling load in order to reduce stresses on the device and protect the structure to which it is attached from damage.

When working at height, for example on high ladders or on electricity towers, users typically secure themselves to the fixed structure they are climbing via safety cables and the like, so that in the event that they slip they cannot fall beyond the length of the cable and their fall will be arrested before they reach the ground.

However, despite such systems preventing injury to user from falling to the ground from a structure when working at height, the force arising from the full momentum of a falling user being resisted by rope or cable alone is significant and can result in damage to the fall arrest system and/or the structure itself.

To address this, some fall arrest systems incorporate a shock absorber in which a textile element tears at stitching and/or stitched fabric to absorb energy in decelerating a falling user prior to the force arising from his full momentum being resisted by a rope or cable alone. This reduces the shock loads experienced throughout the fall arrest system/structure and also the user. However, such conventional shock absorbers are often unpredictable with respect to the force required to tear the stitching or fabric and are typically attached directly to the user, rather than being provided at the load application point of a fall arrest system. Further, they do not provide protection to the structure to which the fall arrest system is attached. This is particularly important as the part of the structure to which the fall arrest system is attached, which typically projects outwards from the structure, may not be strong enough to take the stresses applied by the falling load when it reaches the full extent of the rope or cable.

There is therefore a need for an improved fall arrest system that effectively reduces the applied moment on application of a threshold load to the system to reduce stresses on the fall arrest system and the structure to which it is attached, thereby preventing damage to the fall arrest system and/or the structure.

The present seeks to address the problems of the prior art.

SUMMARY OF THE INVENTION

According to an aspect of the present invention, there is provided a fall arrest device comprising:

a. a bracket having a first engagement element and a second engagement element aligned with the first engagement element;

b. a cantilever element comprising:

i. a first bracket engagement portion for fixed engagement with the first engagement element;

ii. a second bracket engagement portion aligned with the first bracket engagement portion, the second bracket engagement portion for pivotable engagement with the second engagement element;

iii. a load application point located distal to the first and second bracket engagement portions; and iv. a first deformable element located between the load application point and the first bracket engagement portion, the deformable element being dimensioned for plastic shock absorbing deformation or fracture on application of a predetermined load at the load application point.

The bracket is intended for securing to a surface such as a vertical surface, horizontal surface, or other suitable securing position, on a ladder, tower, or other tall structure to be climbed by a user. The bracket allows the wire rope of the safety system, which would be attached to the load application point, to be held away from the vertical surface where it is needed for climbing. Prior to the application of a predetermined load at the load application point, the cantilever element is held in position relative to the bracket by means of the fixed engagement of the first bracket engagement portion with the first engagement element.

On application of a load equal to or exceeding a predetermined load at the load application point, the first deformable element is deformed (whether by plastic shock absorbing deformation or by fracture), thereby allowing the second bracket engagement portion of the cantilever element to pivot relative to the second engagement element.

The deformation of the first deformable element and associated pivoting of the cantilever element relative to the bracket acts to absorb energy and also reduce the moment applied through the load application point, which in turn reduces stresses on both the bracket and the structure to which it is attached.

In one embodiment, the first deformable element is of reduced dimension compared to respective portions of the cantilever element located between the first deformable element and the first bracket engagement portion, and between the first deformable element and the load application point.

In a further embodiment, the load application point and the first bracket engagement portion define an axis Y and wherein the first deformable element is aligned with axis Y.

The deformable element may comprise a portion of reduced dimension compared with one or both of the respective adjacent portions located between the first deformable element and respective first bracket engagement portion and load application point. Thus, the first deformable element would deform (whether by plastic shock absorbing deformation or by fracture) on application of a predetermined load at the load application point, without damage to either of the respective portions located adjacent to the first deformable element.

In a further embodiment, the load application point and the first bracket engagement portion define an axis Y and wherein the first deformable element deviates from axis Y. For example, the first deformable element may comprise a U-shaped or S-shaped member or any other shape that deviates from axis Y.

Preferably the cantilever element defines a first plane, and the first deformable element extends along the first plane.

In a further embodiment, the first deformable element comprises a deformable element dimensioned for plastic shock absorbing deformation, the cantilever element further comprises a second deformable element located between the load application point and the first bracket engagement portion, the second deformable element being dimensioned for fracture on application of a predetermined load at the load application point.

Preferably, the second deformable element extends along axis Y.

In one embodiment, the second deformable element fractures at a predetermined load that is the same or less than the predetermined load at which the first deformable element deforms. Thus, the cantilever element provides staged energy absorption by the deformable elements deforming in sequence such that the pivoting of the cantilever element about the first engagement element is slowed. This has the added advantage that there will be very little, if any, deflection of the cantilever element until the predetermined load is reached.

DETAILED DESCRIPTION

Figure 1:
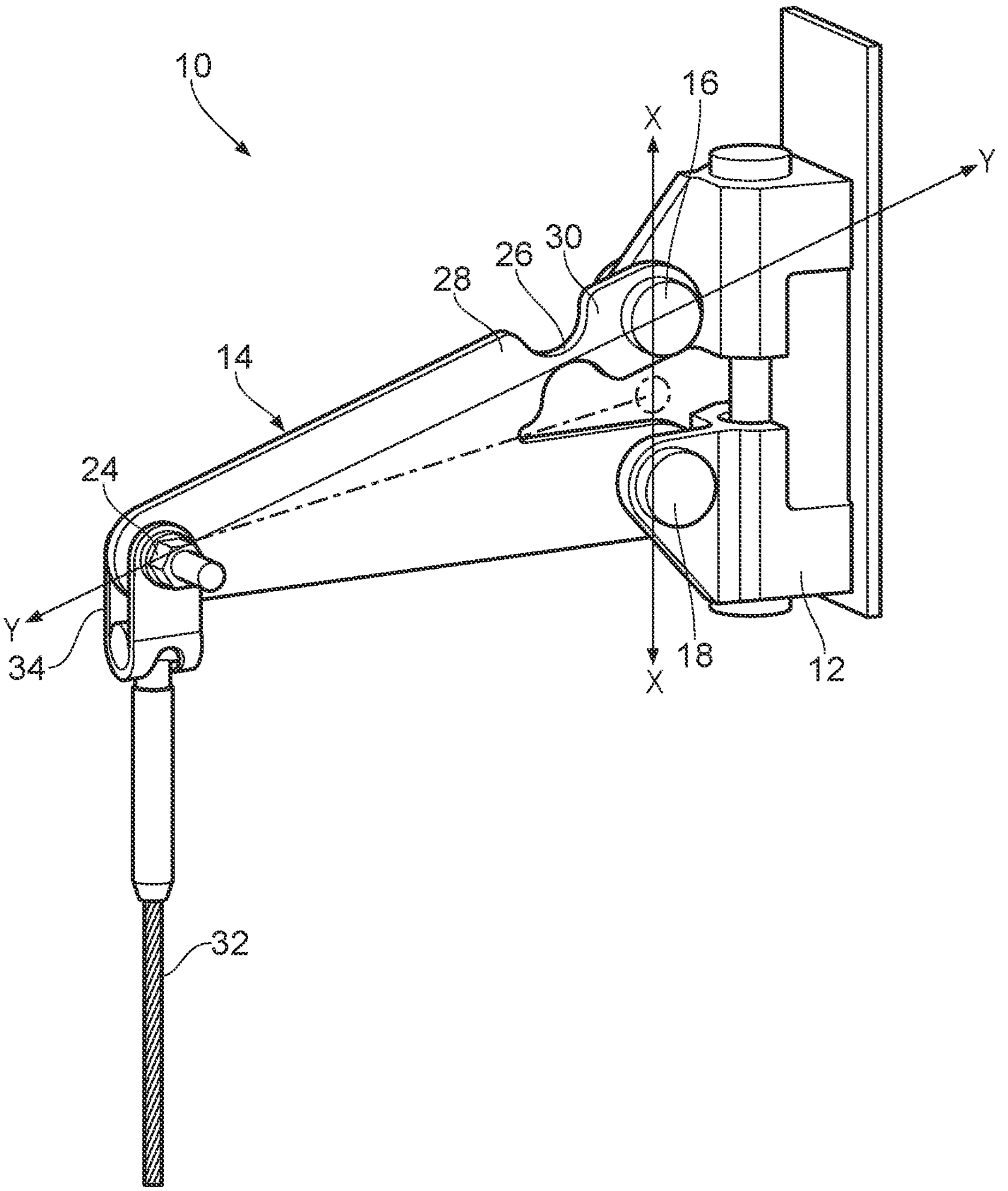
FIG. 1 is a perspective view of a first embodiment of a fall arrest system in accordance with the present invention.

FIG. 1 shows a fall arrest device 10 comprising a bracket 12 and a cantilever element 14.

Bracket 12 comprises a first engagement element 16 and a second engagement element 18 aligned with the first engagement element 16 along first axis X.

Cantilever element 14 comprises a first bracket engagement portion 20 and a second bracket engagement portion 22 and a load application point 24 located distal to both the first and second bracket engagement portions 20, 22.

First bracket engagement portion 20 is secured to first engagement element 16 and is fixed in position relative to bracket 12.

Second bracket engagement portion 22 is engaged with second engagement element 18 and is pivotable relative to bracket 12 about second engagement element 18.

Cantilever element 14 is further provided with a first deformable element 26 located between the load application point 24 and the first bracket engagement portion 20. In the embodiment shown in FIG. 1, the first deformable element is located along second axis Y i.e., aligned with load application point 24 and first bracket engagement portion 20. Deformable element 26 is of narrowed dimension compared with adjacent portions 28, 30. This narrowed dimension facilitates deformation of first deformable element 26 on application of a predetermined load at load application point 24 without deformation of adjacent portions 28, 30.

In the embodiment shown in FIG. 1, on application of a predetermined load at load application point 24, first deformable element 26 will undergo plastic shock absorbing deformation. This results in bending of cantilever element 14 about first deformable element 26 such that cantilever element 14 pivots about second engagement element 18 whilst remaining fixed relative to first engagement element 16, thus absorbing energy and reducing moment applied by the load at load application point 24. This causes load application point 24 to move out of alignment with axis Y. In use, bracket 12 is secured to a structure (not shown) to be climbed by a user. This may be achieved by any conventional manner known to the skilled person and suitable for function including, but not limited to, any one or more of bolting, welding, riveting, using cross pins and the like. Cantilever element 14 is then engaged with bracket 12 by securing first bracket engagement portion 20 of cantilever element 14 in fixed engagement with first engagement element 16 of bracket 12; and by securing second bracket engagement portion 22 of cantilever element 14 in pivotable engagement with second engagement element 18 of bracket 12.

Cable securing element 34 of cable 32 is then engaged with cantilever element at load application point 24. The user is secured to the cable 32 at an opposing end (not shown).

Provided the load through load application point 24 does not exceed the predetermined load, the cantilever element 14 will remain in its original fixed engagement with the bracket 12, with both first bracket engagement portion 20 and load application point 24 aligned along axis Y.

However, if the user falls, when they reach the extent of the cable 32 to which they are attached, a load through the load application point 24 will exceed the predetermined load, the predetermined load selected to be less that the load exerted by the weight of a user at the full extent of the cable 32, the deformable element 26 will fracture, allowing cantilever element 14 to pivot about second engagement element 18, thus reducing the moment at load application point 24, thereby reducing the stresses at bracket and the structure to which it is attached. This serves to protect the bracket and structure from potential damage. It is to be appreciated that the bracket and the portion of the structure to which it is attached may be weaker than the rest of the structure and thus may not be strong enough to take the stress applied by the fallen load at a distance so far out from the core of the structure. Therefore, by including a deformable element 26 that fractures when the load through the load application point exceeds a predetermined load, the fracture and consequential pivoting of the second engagement element 18 effectively reduces the distance the cantilever element extends from the bracket, thereby bringing the stresses within a threshold that can be handled by the structure to which the bracket is attached.

Figure 2B:
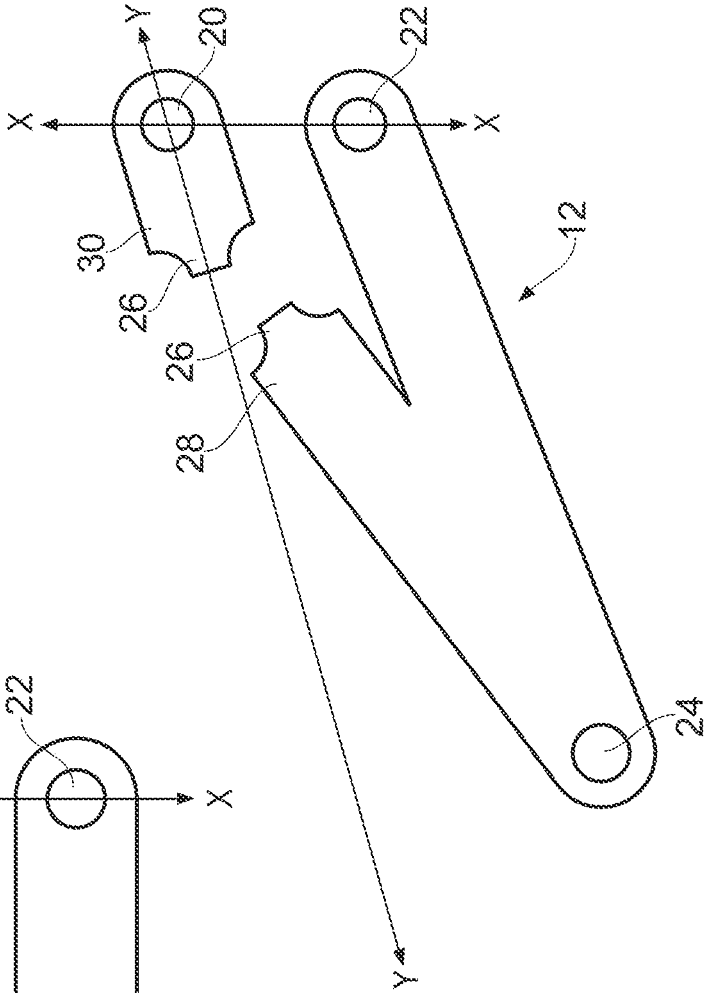
FIG. 2B is a side view of the cantilever element of FIG. 2A after application of a predetermined load at the load application point.
Figure 2A:
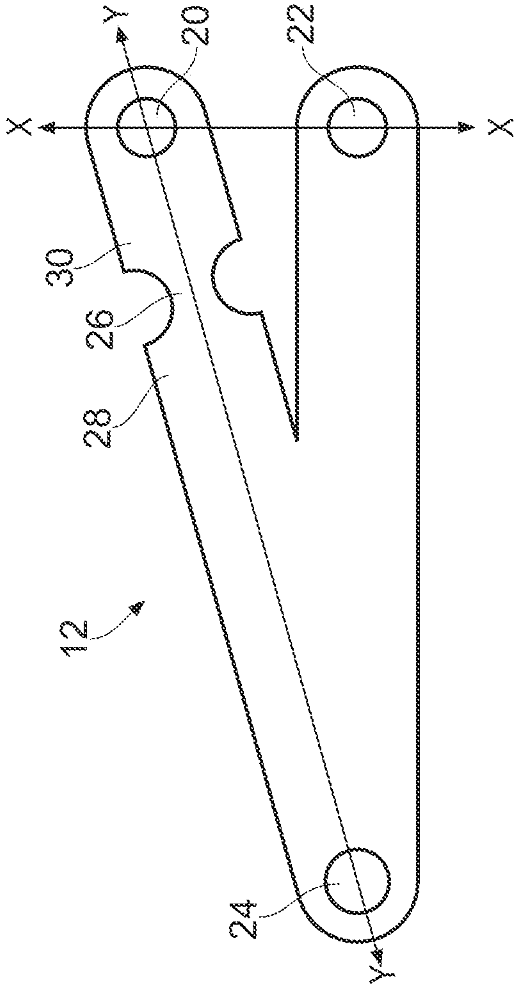
FIG. 2A is a side view of a cantilever element of a second embodiment of a fall arrest system in accordance with the present invention.

FIGS. 2A and 2B show a second embodiment of a cantilever element 14 for use with the bracket 12 shown in FIG. 1. Cantilever element 14 comprises a deformable element 26 having a similar but slightly more angular contour than that of deformable element 26 of FIG. 1. FIG. 2A represents the cantilever element 14 in a pre-deformed configuration where the load application point 24 and first bracket engagement portion 20 are aligned along axis Y.

If the user should fall and a load the same as or exceeding the predetermined load be applied through load application point 24, first deformable element 26 will fracture as shown in FIG. 2B and cantilever element 14 will pivot relative to bracket 12 as shown in FIG. 2B. In FIGS. 2B, load application point 24 is no longer in alignment with first bracket engagement portion 20 along axis Y. During the fracture of deformable element 26 and the pivoting of cantilever element 14 about second engagement element 18, the applied moment is reduced, which in turn reduces the stresses both on the bracket 12 and on the structure to which it is attached.

Figure 3A:
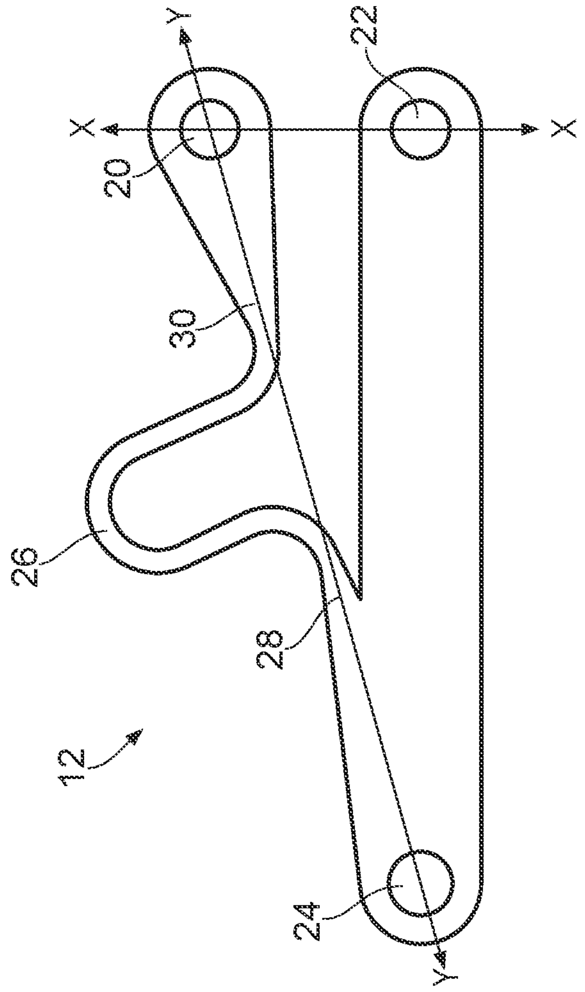
FIG. 3A is a side view of a cantilever element of a third embodiment of a fall arrest system in accordance with the present invention.
Figure 3B:
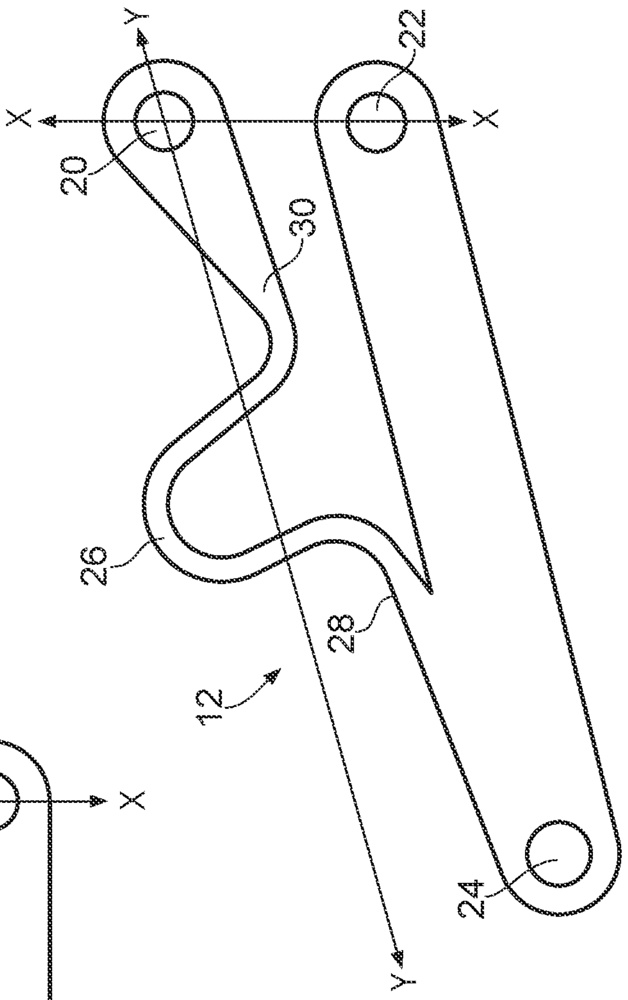
FIG. 3B is a side view of the cantilever element of FIG. 3A after application of a predetermined load at the load application point.

FIGS. 3A and 3B show a third embodiment of a cantilever element 14 for use with the bracket 12 shown in FIG. 1. Cantilever element 14 comprises a U-shaped deformable element 26 which deviates from axis Y with which first bracket engagement portion 20 and load application point 24 are aligned. As with the previous embodiments, deformable element 26 is of reduced cross-sectional area compared with respective adjacent portions 28, 30.

When a predetermined load is applied at load application point 24, deformable element 26 will undergo plastic shock absorbing deformation as shown in FIG. 3B such that cantilever element 14 pivots about second engagement element 18 of bracket 12 and load application point 24 pivots out of alignment with axis Y. Cantilever element 14 thereby absorbs energy and reduces the applied moment, which in turn reduces the stresses on the bracket and thus the structure to which the bracket is secured, thereby avoiding consequential damage to the structure.

Although the deformable element 26 of cantilever element 14 in FIGS. 3A and 3B is shown as a substantially U-shaped element, it is to be appreciated that deformable element 26 may have any extended contour of reduced cross-sectional area that deviates from alignment along axis Y, and thus will undergo plastic shock absorbing deformation under a predetermined load applied through load application point 24 to reduce the applied moment through pivoting load application point 24 out of alignment with first bracket engagement portion 20 and away from axis Y in a downward direction i.e. towards the applied load.

Figure 4:
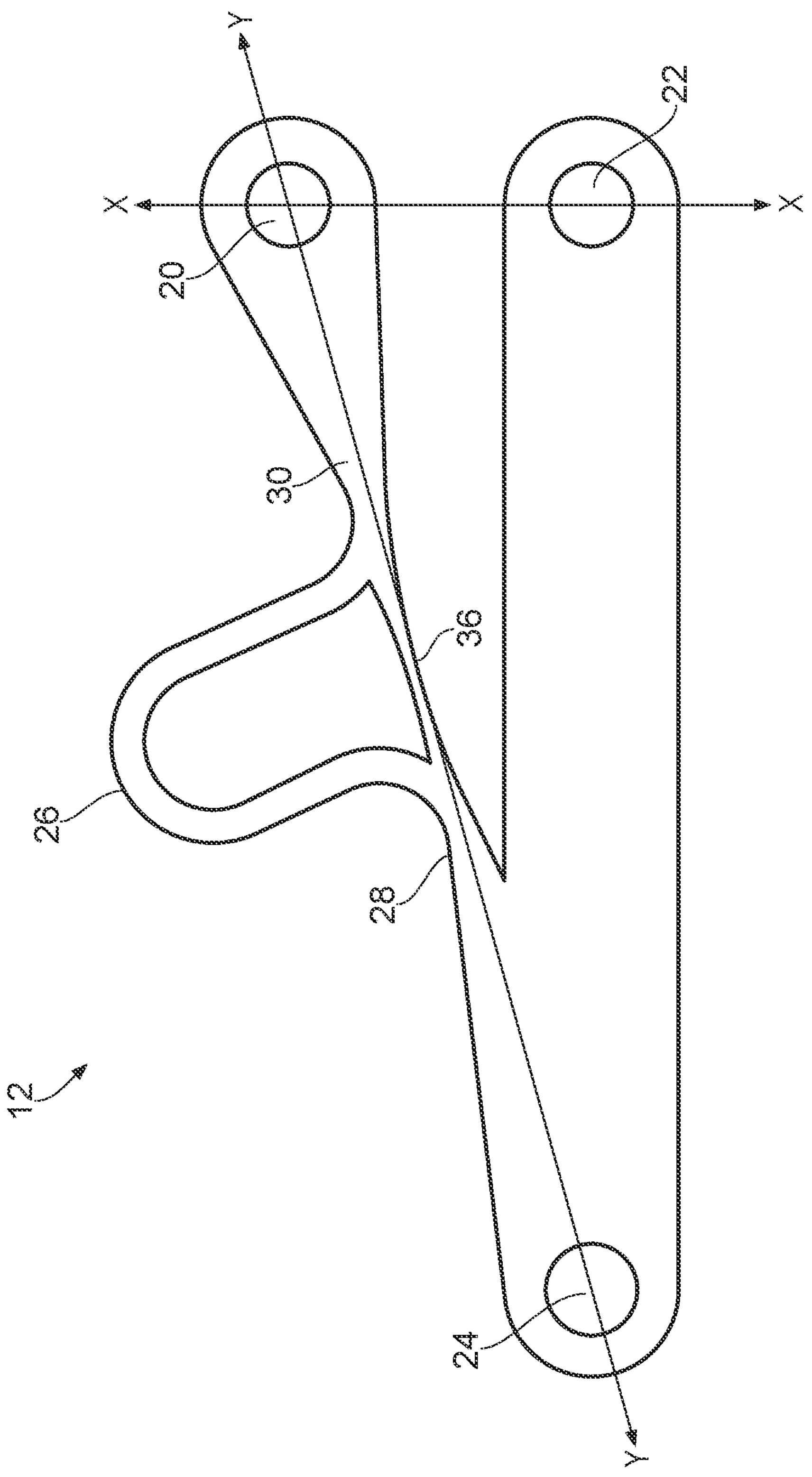
FIG. 4 is a side view of a cantilever element of a fourth embodiment of a fall arrest system in accordance with the present invention.

FIG. 4 shows a fourth embodiment of a cantilever element for use with the bracket 12 shown in FIG. 1. Cantilever element 14 comprises a first deformable element 26 similar in contour and reduced dimension to the deformable element 26 of FIG. 3A. In addition, cantilever element 14 comprises a second deformable element 36 in the form of a fracture element having reduced cross-sectional area when compared to respective adjacent portions 28, 30. In addition, second deformable element 36 has reduced cross-sectional area when compared with that of first deformable element 26.

On application of a predetermined force through load application point 24, second deformable element 36 would fracture, followed by plastic shock absorbing deformation of first deformable element 26 to allow pivoting of cantilever element 14 about second engagement element 18, thus absorbing energy and reducing the applied moment, which in turn reduces stresses on the bracket and the structure to which it is secured. This two-step deformation i.e., fracture followed by plastic shock absorbing deformation provides a slightly slower deformation than that observed with the cantilever element 12 of FIGS. 3A and 3B. Thus, providing even more controlled energy absorption and reduction of the shock loads experienced throughout the fall arrest system and also the user, thereby avoiding damage to the bracket 12 of the fall arrest device 10 and the structure to which it is attached. By providing a cantilever element that deforms (by facture and/or plastic deformation) under an applied threshold load to reduce the applied moment, and thereby reduce the stresses on both the fall arrest system and structure to which it is secured, the fall arrest system and structure are not having to cope with the applied moment that would otherwise be experienced. Therefore, a significant advantage of the fall arrest device of the present application is that it can be of reduced weight due to an overall reduced strength requirement. This has associated cost benefits as well as increasing the ease of installation of the fall arrest system on existing structures.

The invention claimed is:

1. A fall arrest device comprising:

a. a bracket having a first engagement element and a second engagement element aligned with the first engagement element;

b. a cantilever element comprising:

i. a first bracket engagement portion for fixed engagement with the first engagement element;

ii. a second bracket engagement portion aligned with the first bracket engagement portion, the second bracket engagement portion for pivotable engagement with the second engagement element;

iii. a load application point located distal to the first and second bracket engagement portions; and iv. a first deformable element located between the load application point and the first bracket engagement portion, the deformable element being dimensioned for plastic shock absorbing deformation or fracture on application of a predetermined load at the load application point.

2. The fall arrest device as claimed in claim 1, wherein the first deformable element is of reduced dimension compared to portions of the cantilever element located between the first deformable element and the first bracket engagement portion, and between the deformable element and the load application point.

3. The fall arrest device as claimed in claim 1, wherein the load application point and the first bracket engagement portion define an axis X and wherein the deformable element is aligned with axis X.

4. The fall arrest device as claimed in claim 1, wherein the load application point and the first bracket engagement portion define an axis X and wherein the first deformable element deviates from axis X.

5. The fall arrest device as claimed in claim 4, wherein the first deformable element is substantially S shaped.

6. The fall arrest device as claimed in claim 1, wherein, when the first deformable element comprises a deformable element dimensioned for plastic shock absorbing deformation, the cantilever element further comprises a second deformable element located between the load application point and the first bracket engagement portion, the second deformable element being dimensioned for fracture on application of a predetermined load at the load application point.

* * * * *